3,451,507
TROLLEY HOIST BRAKE WITH DEADMAN
CONTROL
Gerard R. Santos, Levittown, Pa., assignor to Eaton Yale
& Towne Inc., Cleveland, Ohio, a corporation of Ohio
Filed Apr. 20, 1967, Ser. No. 632,420
Int. Cl. B61h 7/12, 7/00; B60t 7/12
U.S. Cl. 188—44         15 Claims

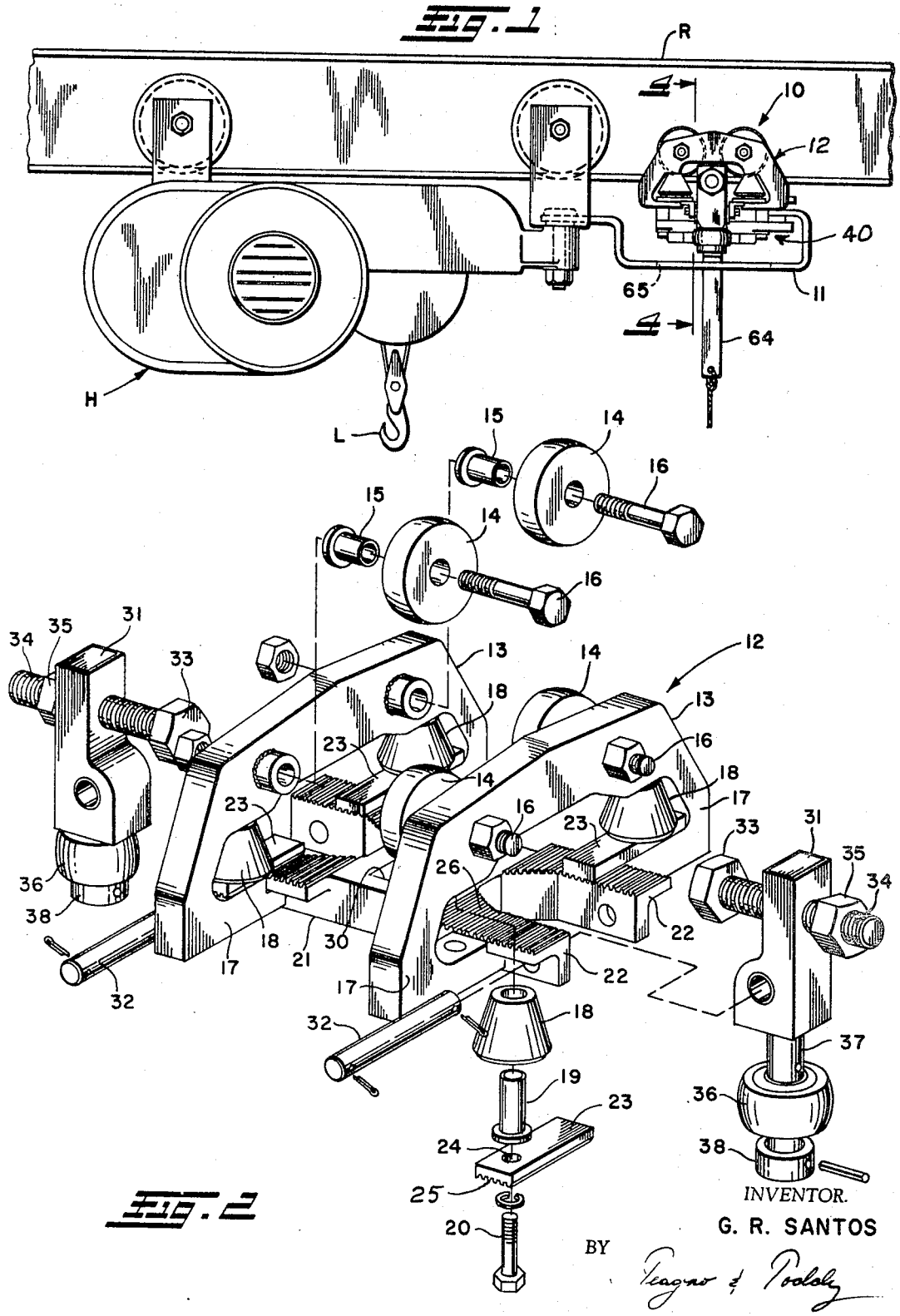

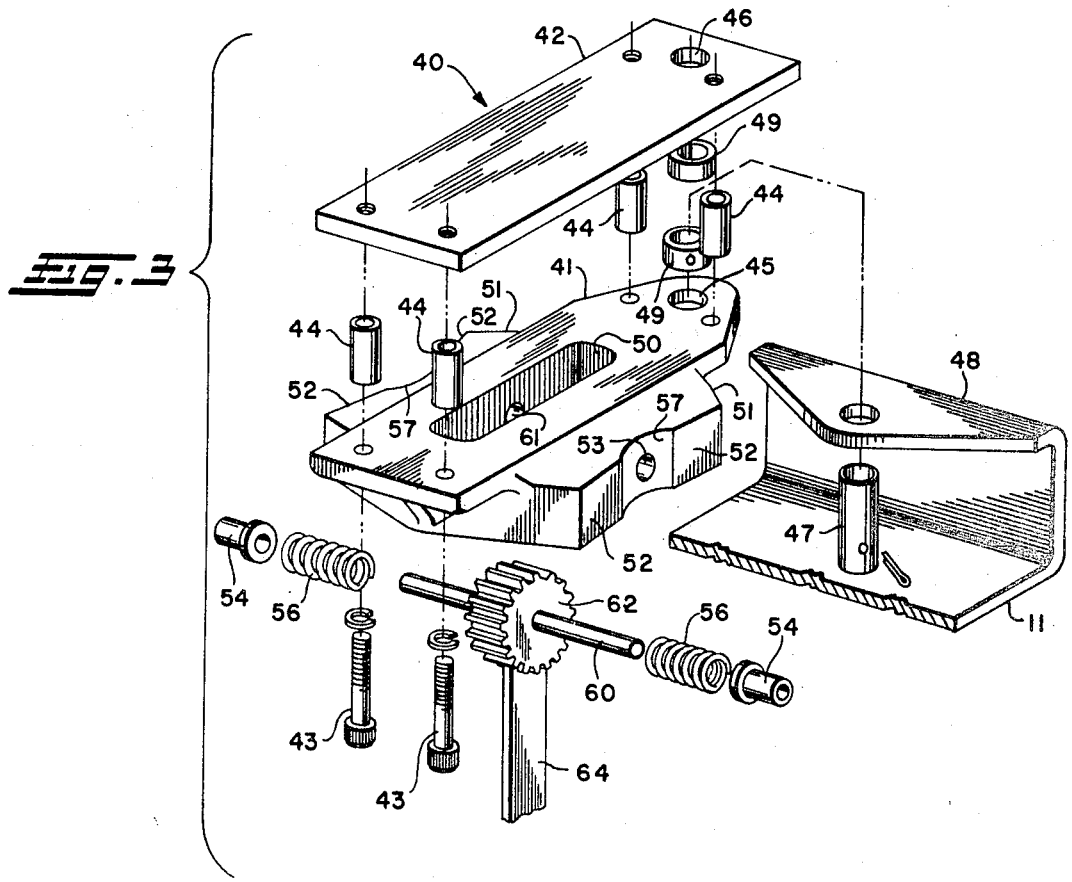
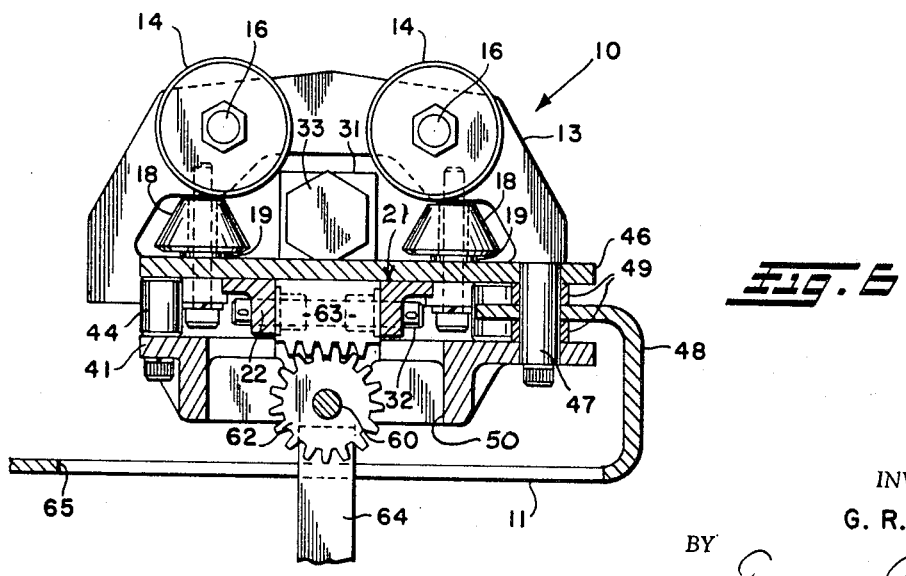

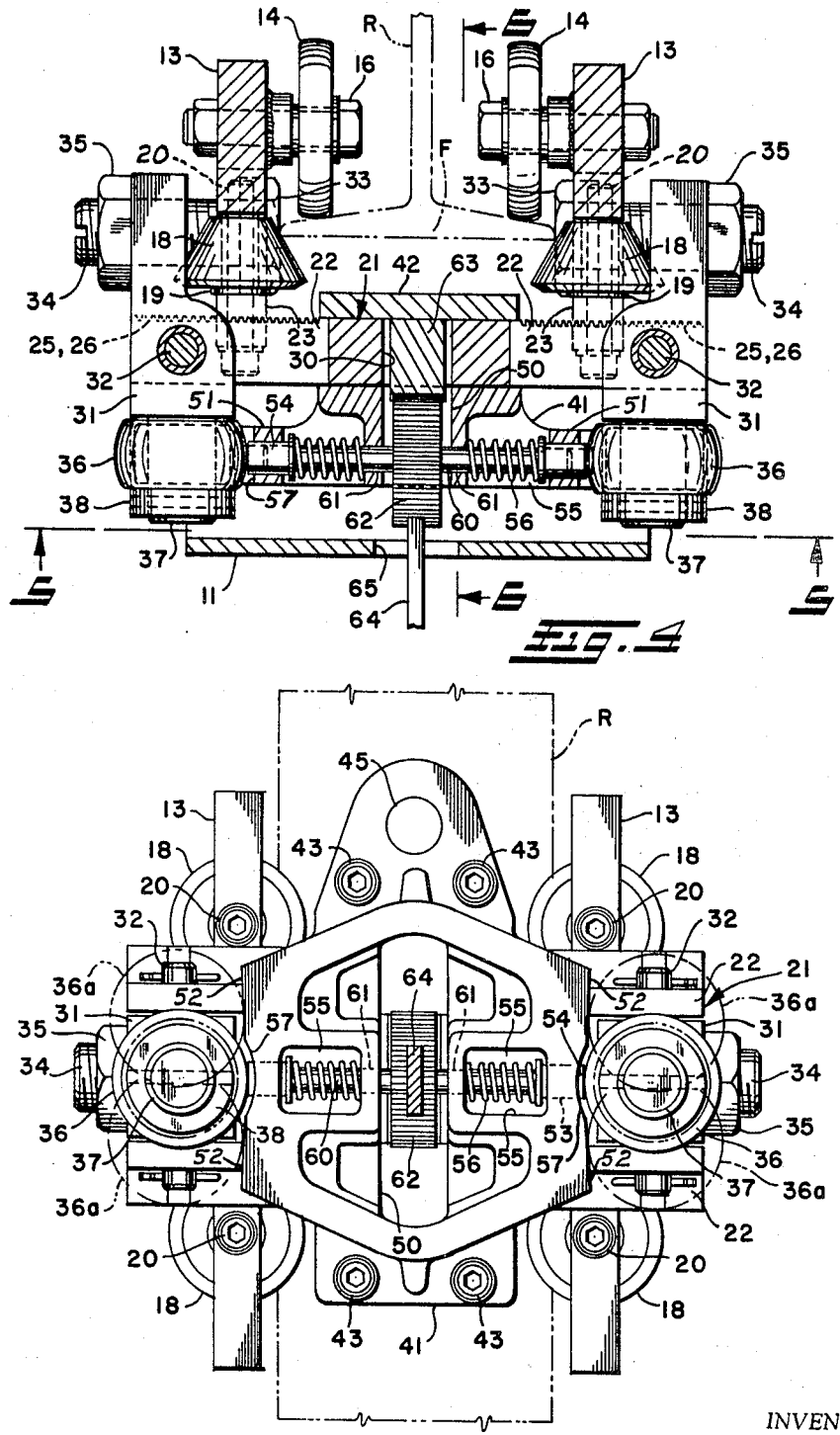

ABSTRACT OF THE DISCLOSURE

A brake assembly is mounted for movement on the same trolley rail as a hoist, and is connected to the hoist through a slide that is in cam relation to brake jaws on the assembly. The brake jaws have an initial spring pressure causing a small amount of friction holding the brake assembly against movement, so that the hoist when starting to move will cause the cam action of the slide to press the brake jaws forcibly against the rail. The slide can be manually held in neutral position, allowing the brake and hoist to travel on the rail.

---

This invention relates to trolley hoist brakes.

As will be understood by those skilled in the art, the brakes of the particular kind are utilized for controlling the movements of a hoist along a trolley rail, often being needed where the rail is inclined. The brakes have been used on shipboard, for example, where a rail will shift its position due to the motion of the ship, and where it may be extremely dangerous to permit an uncontrolled movement of the hoist in relation to the rail. My invention relates particularly to a novel brake construction that will offer manual and automatic control for the travel of a trolley hoist, and that will very effectivey prevent runaway movements of the hoist on its rail.

In the novel concept of my invention, there is a brake assembly that is mounted on the same rail as a hoist, and that is so connected that there may be a limited motion between the hoist and brake assembly relatively to the rail. I utilize that limited motion to actuate the brake assembly so as to press a brake shoe against the rail. As a feature, there are means applying the brake shoe with an initial pressure, effectively holding the brake assembly so that the hoist when starting to move may positively actuate the brake assembly. I then arrange means that normally enable an operator to relieve the braking pressure, so that the hoist can move while under the operator's control.

As another feature, I utilize actuating means, that may comprise a cam, through which a force tending to move a hoist along a trolley rail will press a brake shoe against the rail. Those means will cause the pressure of the brake shoe to increase with an increase in the effective load, safely controlling the movement of the hoist without regard to the weight and momentum of the load or the inclination of the rail. As a further safety feature of my invention, the actuating means will oppose the operation of manual release means for the brake shoe.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention in order to prevent the appropriation of my invention by those skilled in the art.

In the drawings:

FIG. 1 shows a trolley hoist utilizing my brake.

FIG. 2 shows an exploded view of parts of a brake assembly that I utilize in my brake.

FIG. 3 shows an exploded view of the brake operating means.

FIG. 4 shows a cross section on the line 4—4 in FIG. 1.

FIG. 5 shows a bottom view on the line 5—5 in FIG. 4.

FIG. 6 shows a longitudinal section on the line 6—6 in FIG. 4.

Referring more particularly to FIG. 1 of the drawings, I indicate the brake of my invention generally by the numeral 10, and I show the brake connected through a member 11 to a trolley supported hoist H having a load hook L. The details of the hoist H are not important to an understanding of my invention, and it is merely necessary to know here that the brake 10 is supported on the same rail R as is the hoist H, while member 11 connects the brake and hoist so as to move with one another on the rail.

So that my invention may readily be understood, it will be best to refer now to FIG. 2 while I describe a brake assembly 12 that forms a part of the brake 10. The brake assembly 12 includes a pair of side plates 13 on which I mount pairs of trolley wheels 14 in opposed relation to each other, as through bearings 15 on bolts 16. Wheels 14 are arranged at the upper portions of the side plates 13 and, as indicated in FIG. 4, will run on the surfaces of the lower flange F on trolley rail R. The side plates 13 are somewhat C-shaped so as to form inwardly directed lower end portions 17, and I utilize those end portions 17 for mounting tapered guide rollers 18. Each guide roller 18 is assembled on a flanged bushing 19 in the space between a lower end portion 17 and the upper part of the side plate 13, a bolt 20 being inserted and threaded into an opening in the upper part of plate 13, as may be seen in dotted lines in FIG. 4. The guide rollers 18 then will be in position to run along the edges of rail flange F, FIG. 4. Due to their taper, rollers 18 will effectively guide the main frame 12 in aligned relation to rail R.

Again referring to FIG. 2, side plates 13 are assembled through a cross frame 21 having at each side a pair of angular portions 22 that are seated on the inwardly directed end portions 17 of plates 13. To hold each angular side portion 22 in seated position, I prefer to utilize a dog 23 that has an opening 24 for the bolt 20, and that is assembled between the corresponding bushing 19 and end portion 17 of side plate 13, so as to extend over the angular side portion 22 of frame 21. Further, dog 23 and and side portion 22 are formed with grooved surfaces 25, 26 that interengage. Bolt 20 when tightened will cause the flange of bushing 19 and end portion 17 to grip dog 23, which in turn will act through the grooved surfaces 25, 26 to hold the angular frame portion 22. Cross frame 21 thus is securely assembled to the side plates 13.

At this point I may call attention to the fact that the dogs 23 are adapted to engage different portions of the grooved surfaces 26 on frame 21. That enables the distance between the side plates 13 to be chosen so that the wheels 14 and guide rollers 18 will be in position to coact with a trolley rail of a particular width.

The cross frame 21, FIG. 2, is formed with a medial opening 30, to which I shall refer again, and the angular side portions 22 are so formed on each side of the cross frame 21 as to lie in spaced relation to each other. A brake jaw 31 is assembled in the space between each pair of angular side portions 22, utilizing a pin 32 that engages openings in jaw 31 and portions 22 to mount the jaw 31 for pivotal movement. Above the pivot pin 32, each jaw 31 carries a brake shoe 33. As better seen in FIGS. 4 and 6, brake shoe 33 is adapted to move in the opening of the C-shaped side plate 13, and will engage the flange F of the trolley rail R. Each brake shoe 33 has a threaded shank 34 whereby it may be adjusted toward and away from the rail flange F relatively to the brake jaw 31, and there is a jam nut 35 for holding the shoe in adjusted position. Each brake jaw 31 will be controlled through a slope roller 36 that is mounted for rotation on a lower shaft portion 37 of the jaw, and that is retained by a collar 38.

From the description that I have thus far made, it will be seen that the brake assembly 12 will mount wheels and guide rollers firmly in position to coact with a trolley rail, while being adjustable so that it may be used on different widths of rail. It will be observed also that assembly 12 will support brake shoes that can be pressed independently of the wheels and guide rollers, and that also can be adjusted to coact properly with the rail.

In FIG. 3 of the drawings, I show brake operating means 40 that I utilize in my brake, those means including a slide 41, and a slide plate 42 that will be assembled in spaced relation to slide 41 by screws 43 and interposed spacers 44. Referring for a moment to FIGS. 4 and 6, it will be seen that the spaced relation between slide 41 and plate 42 is such that the slide and plate will embrace the cross frame 21, while adapted to slide through a limited distance in a longitudinal direction on frame 21. Slide 41 and plate 42 also may have movement of adjustment in a transverse direction on frame 21.

Returning to FIG. 3, corresponding end portions of slide 41 and plate 42 are formed with openings 45, 46 for a pin 47 that secures an end portion 48 of the connecting member 11 to the slide. I show collars 49 that will be assembled on pin 47 for holding the end portion 48 of member 11 in spaced position between the slide and plate. A medial part of the slide 41 is formed with a longitudinally extending clearance opening 50, while slide 41 is formed on opposed sides with cam portions 51. Each cam portion 51 has a pair of oppositely inclined cam slopes 52, seen also in FIG. 5, for acting against the slope roller 36 on a brake jaw 31. At a point intermediate the cam slopes of each pair of slopes 52, I form a bore 53 in which I assemble a control plunger 54 for movement in the transverse axis of slide 41, as shown in FIGS. 5 and 6.

As shown in FIGS. 4 and 5, the bottom surface of slide 41 is formed inwardly of each bore 53 with a spring pocket 55, and in each pocket 55 I assemble coil spring 56 that will press the plunger 54 in an outward direction. When slide 41 is in neutral position, as in FIGS. 4 and 5, the spring pressure of each plunger 54 will act against a corresponding slope roller 36 and its brake jaw 31 whereby to press the brake shoe 33 toward the flange F on trolley rail R, as shown in FIG. 4. I may form each cam portion 51 of the slide 41 with a rounded clearance portion 57 in which the slope roller 36 may be engaged by a plunger 54, but I do not wish to be limited by that clearance portion because in some cases it will not be needed for effective operation of the brake.

Presently I shall explain the operation of the brake 10, but at this point it may be observed that slide 41, when moving away from neutral position, will move plungers 54 away from slope rollers 36 while moving one or another cam slope 52 into contact with each roller 36. In FIG. 5, I have used phantom lines 36a merely to show examples of contacting relationships between rollers 36 and slopes 52, as would be due to movements of slide 41. I have already alluded to the fact that slide 41 may have some transverse movement, and by that movement the slide 41 will be able to operate in a position as may be required when the brake is on a curved rail.

I shall now describe means whereby the operator may control the movements of the slide 41. In FIGS. 3 to 6, I show a shaft 60 arranged in the clearance opening 50 of the slide 41, and mounted to rotate in bores 61 at opposed sides of the opening in the transverse axis of the slide. As actually shown, I have chosen to utilize shaft 60 for guiding the coil springs 56 and plungers 54, the end portions of shaft 60 being extended through the springs and into openings in the plungers. I mount a control gear 62 on the part of shaft 60 that is in the clearance opening 50. Further, I assemble a rack portion 63 in position in the medial opening 30 of the cross frame 21 and meshing with control gear 62. I show a control lever 64 secured to gear 62, as by welding, and extending downwardly through a clearance opening 65 formed in the connecting member 11. The operator may, with certain limitations that I shall describe, utilize the control lever 64 to control the rotation of the gear 62, thus controlling the position of slide 41 relatively to the main frame 12.

I have not described in detail the member 11 that connects the brake 10 and hoist H, but I do prefer to utilize as the member 11 a heavy plate that is bent to angular shape, as shown in FIG. 1. The connecting member 11 then will act firmly to hold the brake 10 and hoist H substantially in predetermined relation to each other on the rail R, but nevertheless can yield somewhat so as to absorb shocks that may be due to the operation of the brake.

OPERATION

Before the hoist H starts to move on rail R, the brake operating slide 41 may be in the neutral position shown in FIG. 5, and the spring pressed plungers 54 on slide 41 then are in position causing the brake shoes 33 to press against the rail flange F. FIG. 4 illustrates that operation of plungers 54. The braking pressure that is effected by those plungers is an initial pressure that will be relatively small, so that it will not oppose to any great extent a movement of brake 10 and hoist H along rail R. However, it is important to understand that the initial braking pressure does cause some friction tending to hold the brake assembly 12 against movement on the rail R.

Therefore the hoist H, when starting to move, will slide the brake operating means 40 including slide 41 in a corresponding direction relatively to the brake jaws 31. Certain of the cam slopes 52 on slide 41 then will move against the slope rollers 36, causing the jaws 31 to press brake shoes 33 with considerable force against the rail flange F. Due to their inclination, the cam slopes 52 will limit the movement of the brake operating means 40 relatively to brake jaws 31 and assembly 12. At the same time, cam slopes 52 will effect a braking pressure that will increase along with an increase in the force tending to move the brake, so that it may be said that the braking action is substantially proportional to the effective load tending to move the brake on the rail. Also, the inclination of cam slopes 52 is so chosen that the braking pressure, unless further controlled, actually will lock the brake 10 against movement on the rail R, and I have found that slope inclination of 3° will operate well for this purpose.

It will now be seen that I contribute an extremely effective self-locking brake that will automatically act to hold a trolley hoist against movement. When the hoist is to move, it will first be necessary to hold the brake operating slide 21 in a neutral position. The operator normally may do that through the control lever 64, and the hoist then may move while its movement is opposed merely by the small braking pressure that is due to the action of the plungers 54 against slope rollers 36.

Should the operator for any reason fail to hold the lever 64, a movement of the hoist H along rail R will immediately cause slide 41 to move so as to apply the brake in the manner I have described, locking the hoist against further movement along the rail R.

While the operator generally may utilize the lever 64 to control the braking action, I call attention to the fact that the effective load on the brake 10, that is, the force tending to move it along the rail R, will oppose a release of the braking action. That will be readily seen when it is realized that, in order to relieve the pressure that the cam slopes 52 apply to rollers 36, the slide 41 must be moved in a direction opposed to the force that the hoist H applies to it through connecting member 11.

When that force is of sufficient magnitude and the brake is in locked position, the operator will be unable to move the control lever 64 to neutral position. Thus, it will be impossible for the operator to release the brake when the hoist has a dangerous tendency to move, as when the hoist supports a very heavy load and is supported on a rail that is steeply inclined. To release the brake under those conditions, it will be necessary first to relieve the force tending to move the hoist, as by utilizing some means whose capacity is sufficient to move the hoist in the opposed direction. When the hoist is utilized on board ship, the opposed movement may be effected by reverse rolling of the ship, but the brake again will control the movements of the hoist and again will lock unless controlled by the operator.

It will thus be seen that my invention enables me to construct a brake that will offer an operator effective control of the movements of a hoist on a trolley rail, while contributing a "deadman" control operating with a very high degree of safety under different conditions of loading. Moreover, the construction of my brake will enable it to be adjusted for use on rails of different sizes, as may be required by some users.

I believe that the construction and the operation of my novel trolley brake will now be clear, and that those persons who are skilled in the art will understand the very considerable value of my contribution. Therefore, I believe that the merits of my invention will be fully appreciated.

I now claim:

1. In a combination of the class described including a load hoist equipped with means engaging a trolley rail and supporting said hoist and its load for movement in a horizontal direction longitudinally on the rail, a brake assembly for said hoist adapted to be mounted for longitudinal movements on the same trolley rail as said hoist, a brake shoe for said assembly movably mounted on said assembly, a connecting mechanism connecting said hoist and said brake assembly and having a lazy action whereby to permit limited longitudinal motion between said brake assembly and hoist relatively to said rail, and means actuated by said connecting mechanism on said brake assembly to apply said brake shoe to said rail incidental to a motion between said hoist and assembly.

2. In the combination of claim 1, the feature that said brake assembly comprises a spring normally pressing said brake shoe lightly against the trolley rail to present a yielding resistance to movement of the brake assembly on the rail, so that the hoist when starting to move on the rail will have motion relatively to the brake assembly.

3. In the combination of claim 1, the feature that a manually operated device is connected to said assembly for controlling the application of the brake shoe to the rail.

4. In the combination of claim 2, the feature that a manually operated device is connected to said assembly for controlling the application of the brake shoe to the rail.

5. In a combination of the class described including a load hoist equipped with means engaging a trolley rail and supporting said hoist and its load for movements in a horizontal direction longitudinally on the rail, a brake assembly for said hoist adapted to be mounted for longitudinal movements on the same trolley rail as said hoist, a brake shoe for said assembly movably mounted on said assembly, means of connection between said hoist and said brake assembly for effecting movement of said brake assembly together with said hoist along said rail, means presenting a yielding resistance to movement of said brake assembly on said rail so that the hoist will stress said means of connection when the hoist tends to move on said rail in response to a movement of said rail, as for example, by the tilting of a ship to which said rail may be secured, and means actuated by said means of connection when stressed by the hoist to press said brake shoe against said rail whereby to brake the movements of the hoist on the rail.

6. In the combination of claim 5, spring means lightly pressing the brake shoe against the rail to effect said yielding resistance to movement of the brake assembly on the rail.

7. In the combination of claim 5, a cam movable on the brake assembly and responsive to the stressing of said means of connection whereby to press the brake shoe against the rail.

8. In the combination of claim 6, a cam movable on the brake assembly and responsive to the stressing of said means of connection to increase the brake shoe pressure whereby to oppose forcibly the movement of the brake assembly.

9. In the combination of claim 8, said cam forming a slide moving relatively to a neutral position on the brake assembly when said means of connection are stressed, and said spring means mounted in position on said slide to press the brake shoe when the slide is in neutral position.

10. In the combination of claim 9, a manually operated device connected to the slide for holding said slide in neutral position whereby to permit travel of the brake and hoist on the rail.

11. In a trolley hoist brake, a brake assembly adapted to be mounted for movement on a rail, including a moveable brake jaw having a shoe for engaging the rail, a slide mounted for limited movement on the brake assembly, spring pressed means mounted on said slide and coacting with the brake jaw when the slide is in a neutral position to press said shoe with an initial pressure against the rail, a cam slope on said slide acting against the brake jaw as the slide moves away from neutral position to press the shoe with increasing pressure against the rail, and means for connecting said slide to a hoist on the rail so that the hoist when starting to move may move the slide to effect full braking by said brake shoe.

12. A construction as set forth in claim 11, including manually operated means for holding said slide in neutral position whereby to permit travel of the brake and the hoist on the rail.

13. A construction as set forth in claim 11, in which the inclination of said cam slope is so chosen that the increasing pressure of the brake shoe will lock the brake assembly against movement on the rail.

14. In a trolley hoist brake, a pair of side plates equipped with wheels adapted to run along opposed side portions of a rail, a transverse frame means for securing each side plate in different positions on the transverse frame to hold said wheels in positions adjusted for coacting with rails of diffrent widths, a pair of brake jaws mounted each for movement independently of said side plates on said frame and equipped with brake shoes arranged at opposed sides of the rail, and actuating means mounted in position intermediate the brake jaws on said frame for actuating said jaws so as to press the brake shoes toward one another for frictionally engaging side surfaces of the rail.

15. A construction as set forth in claim 14, in which each brake jaw is equipped with means for adjusting its brake shoe to positions for coacting with rails of different widths.

References Cited

UNITED STATES PATENTS

| | | | |
|---|---|---|---|
| 870,305 | 11/1907 | Moore | 188—43 |
| 2,035,700 | 3/1936 | Fraser | 188—42 |
| 3,017,958 | 1/1962 | Richter | 188—43 |
| 3,273,671 | 9/1966 | Vrana | 188—44 |

DUANE A. REGER, *Primary Examiner.*

U.S. Cl. X.R.

188—41, 140